(12) United States Patent
Srinivasan et al.

(10) Patent No.: US 8,440,100 B1
(45) Date of Patent: May 14, 2013

(54) METHOD OF GENERATING HYDROGEN-STORING HYDRIDE COMPLEXES

(75) Inventors: Sesha S. Srinivasan, Tampa, FL (US);
Michael U. Niemann, Venice, FL (US);
D. Yogi Goswami, Tampa, FL (US);
Elias K. Stefanakos, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 13/422,600

(22) Filed: Mar. 16, 2012

Related U.S. Application Data

(62) Division of application No. 12/407,116, filed on Mar. 19, 2009, now Pat. No. 8,153,020.

(60) Provisional application No. 61/037,869, filed on Mar. 19, 2008.

(51) Int. Cl.
*C01B 6/21* (2006.01)
*C01B 6/24* (2006.01)
*C08K 3/12* (2006.01)

(52) U.S. Cl.
USPC .................. 252/188.25; 420/900; 419/32

(58) Field of Classification Search .............. 252/188.25
See application file for complete search history.

(56) References Cited

U.S. PATENT DOCUMENTS

| | | | |
|---|---|---|---|
| 6,251,349 B1* | 6/2001 | Zaluska et al. | 423/286 |
| 2003/0129126 A1* | 7/2003 | Chen et al. | 423/645 |
| 2005/0191236 A1* | 9/2005 | Pinkerton et al. | 423/658.2 |
| 2009/0127129 A1* | 5/2009 | Nazri et al. | 205/477 |

OTHER PUBLICATIONS

Yang, et al.; "A Self-Catalyzing Hydrogen-Storage Material"; Angew. Chem. Int. Ed.; vol. 47, pp. 882-887; 2008.
Lewis, et al.; "High Throughput Screening of the Ternary LiNH2-MgH2-LiBH4 Phase Diagram"; Journal of Alloys and Compounds; vols. 446-447, pp. 355-359; 2007.
Sudik, et al.; "Hydrogen Storage Properties in (LiNH2)2-LiBH4-(MgH2)x-Mixtures (X=0.0-1.0)"; J. Phys. Chem. C; vol. 112, pp. 4384-4390; 2008.

* cited by examiner

*Primary Examiner* — Harold Pyon
*Assistant Examiner* — Katie L Hammer
(74) *Attorney, Agent, or Firm* — Robert J. Varkonyi; Smith & Hopen, P.A.

(57) ABSTRACT

A ternary hydrogen storage system having a constant stoichiometric molar ratio of $LiNH_2:MgH_2:LiBH_4$ of 2:1:1. It was found that the incorporation of $MgH_2$ particles of approximately 10 nm to 20 nm exhibit a lower initial hydrogen release temperature of 150° C. Furthermore, it is observed that the particle size of LiBNH quaternary hydride has a significant effect on the hydrogen sorption concentration with an optimum size of 28 nm. The as-synthesized hydrides exhibit two main hydrogen release temperatures, one around 160° C. and the other around 300° C., with the main hydrogen release temperature reduced from 310° C. to 270° C., while hydrogen is first reversibly released at temperatures as low as 150° C. with a total hydrogen capacity of 6 wt. % to 8 wt. %. Detailed thermal, capacity, structural and microstructural properties have been demonstrated and correlated with the activation energies of these materials.

18 Claims, 13 Drawing Sheets a) Processing Scheme 1 b) Processing Scheme 2

|  | | LiBNH | LicMgBNH | LinMgBNH | 10hr LicMgBNH | LiBNH + cMgH$_2$ | LiBNH + nMgH$_2$ |
|---|---|---|---|---|---|---|---|
| TPD Temperature (°C) | 1st Peak | N/A | 159.2 | 165.2 | 157.7 | 162.1 | 153.3 |
| | Main Peak | 308.5 | 303.6 | 306.6 | 287.0 | 298.8 | 300.3 |
| Activation Energy (kJ/mol) | 1st Peak | N/A | 140.3 | 162.2 | 109.8 | 162.5 | 123.6 |
| | Main Peak | 144.6 | 197.3 | 245.9 | 237.7 | 145.0 | 148.6 |
| H$_2$ Capacity (wt%) | | 4.0 | 3.2 | 3.8 | 1.9 | 5.2 | 5.6 |
| H$_2$ Release Temperature (°C) | | 250.0 | 175.0 | 150.0 | 175.0 | 175.0 | 150.0 |
| Plateau Pressure (bar) | Absorption | N/A | <40 | 20 | N/A | <10 | 21 |
| | Desorption | 20-30 | <10 | 10 | <5 | <5 | <5 |
| Reversibility | | No | Yes | Yes | Less/No | Yes | Yes |
| Particle Size (nm) | LiBNH | 60.0 | 38.7 | 21.0 | 42.1 | 29.0 | 28.1 |
| | MgH$_2$ | N/A | 35.4 | 10.6 | 75.0 | 41.2 | 9.3 |

METHOD OF GENERATING HYDROGEN-STORING HYDRIDE COMPLEXES

CROSS REFERENCE TO RELATED APPLICATION

This application is a divisional application of U.S. patent application Ser. No. 12/407,116, entitled "Hydrogen-Storage Hydride Complexes", filed on Mar. 19, 2009, which claims priority to U.S. Provisional Patent Application No. 61/037,869, entitled "Methods and Processes for Producing Complex Hydrides Exhibiting High Hydrogen Storage Capacity and Fast Sorption Kinetics at Moderate Temperatures", filed on Mar. 19, 2008, the contents of which are herein incorporated by reference.

STATEMENT OF GOVERNMENT INTEREST

This invention was made with Government support under Grant Nos. DE-FG36-04GO14224 awarded by the U.S. Department of Energy. The Government has certain rights in the invention.

FIELD OF INVENTION

This invention relates to hydrogen storage applications. More specifically, this invention relates to complex hydride materials composed of light-weight elements or compounds for hydrogen storage applications.

BACKGROUND OF THE INVENTION

The main source of the energy for 150 years has been fossil fuels. The United States and virtually every other country in the world depend almost exclusively on fossil-fuel-powered transportation. Planes, trains, automobiles, and other engine-powered devices operate by burning petroleum products such as gasoline and diesel fuel. Fossil fuel, however, is a finite resource. According to some projections, its sources will begin to decline in rate of delivery as early as 2010. Currently, the loss of a reliable supply of fossil fuel would have a devastating effect on the whole of western society. For example, people would not be able to travel to work, factories would not be able to transport their products, and emergency services could not be delivered.

Additionally, petroleum fuels must be harvested, stored, processed, and transported. These steps have led to accidents that severely damage the earth's environment. Even minor oil spills, which happen rather frequently, are deadly to wildlife, detrimental to human health, costly, and difficult to clean. Petroleum fuels emit polluting by-products, such carbon dioxide ($CO_2$) and carbon monoxide (CO), nitrogen oxides ($NO_x$), the main source of urban smog, and unburned hydrocarbons, the main source of urban ozone. All of these chemicals have been medically proven to be detrimental to human health. In big cities and other largely populated areas, poor air quality can have a profoundly accelerated damaging effect on human health.

There is consensus that the search for alternative clean and renewable energy should be a prerogative in the near future (Arunachalam, V. S.; Fleischer, E. L. MRS Bulletin 2008, 33, 264). Engineers and scientists have been working hard trying to find other sources of energy that they can use to replace gasoline. The world has many renewable resources such as sunlight, wind, rain, tides and geothermal heat which is naturally replenished. One of the many options is to use hydrogen as a fuel (Crabtree, G. W.; Dresselhaus, M. S. MRS Bulletin 2008, 33, 421). Of particular interest is hydrogen fueled automobiles.

Hydrogen, provided it is produced using clean and renewable energy sources, such as solar energy, can either be combusted in an internal combustion engine or used in a fuel cell (Fontes, E.; Nilsson, E. Industrial Physicist 2001, 7, 14; Stefanakos, E. K.; Goswami, D. Y.; Srinivasan, S. S.; Wolan, J. T. Hydrogen Energy. In Environmentally Conscious Alternative Energy Production; Kutz, Myer, Eds.; John Wiley & Sons, Inc., 2007; pp 165) to produce energy free of any pollutant by-products, producing solely energy and water. Though there are many barriers towards realizing a hydrogen economy, one of the biggest challenges is to find a safe and efficient means of storing the hydrogen for use in mobile applications (Satyapal, S.; Petrovic, J.; Thomas, G. Scientific American 2007, 296, 80). Many of the major automobile manufacturers, including GM, Chrysler, Ford, and Toyota, are already involved in research and development, investing millions of dollars to find an optimum hydrogen storage system for fuel cell car range of 300 miles. However, widespread use of hydrogen has been limited due to devices with adequate storage capacity, cost, weight, and environmental safety for fuel cell based vehicular applications.

Current options include storing hydrogen in its liquid form or as a compressed gas. Both methods require a large amount of energy and can pose serious safety risks. Therefore, there is a push to find a material to chemically store hydrogen using, for example, metal hydrides (Schlapbach, L.; Zuttel, A. Nature 2001, 414, 353) or complex hydrides (Grochala, W.; Edwards, P. P. Chemical Reviews 2004, 104, 1283).

There are, however, many challenges that these materials must overcome. Specifically, these are to have fast kinetics, a high capacity, e.g. more than 6 wt. % hydrogen, and to be reusable for at least 1000 cycles (Satyapal, S.; Petrovic, J.; Read, C.; Thomas, G.; Ordaz, G. Catalysis Today 2007, 120, 246). Advanced complex hydrides that are light weight, low cost and have high hydrogen density are essential for on-board vehicular storage (Biniwale, R. B.; Rayalu, S.; Devotta, S.; Ichikawa, M. International Journal of Hydrogen Energy 2008, 33, 360; David, E. Journal of Materials Processing Technology 2005, 162-163, 169; Guo, Z. X.; Shang, C.; Aguey-Zinsou, K. F. Journal of the European Ceramic Society 2008, 28, 1467; Nijkamp, M. G.; Raaymakers, J. E. M. J.; van Dillen, A. J.; de Jong, K. P. Applied Physics A: Materials Science & Processing 2001, 72, 619; Principi, G.; Agresti, F.; Maddalena, A.; Lo Russo, S. Energy, In Press, Corrected Proof; Ross, D. K. Vacuum 2006, 80, 1084; Zhou, L. Renewable and Sustainable Energy Reviews 2005, 9, 395; Züttel, A. Materials Today 2003, 6, 24). Some of the complex hydrides such as catalyst doped alanates, (Ahluwalia, R. K. International Journal of Hydrogen Energy 2007, 32, 1251; Eigen, N.; Gosch, F.; Dornheim, M.; Klassen, T.; Bormann, R. Journal of Alloys and Compounds 2008, 465, 310; Haiduc, A. G.; Stil, H. A.; Schwarz, M. A.; Paulus, P.; Geerlings, J. J. C. Journal of Alloys and Compounds 2005, 393, 252; Sterlin Leo Hudson, M.; Pukazhselvan, D.; Irene Sheeja, G.; Srivastava, O. N. International Journal of Hydrogen Energy 2007, 32, 4933; Zheng, X.; Qu, X.; Humail, I. S.; Li, P.; Wang, G. International Journal of Hydrogen Energy 2007, 32, 1141; Zattel, A.; Wenger, P.; Sudan, P.; Mauron, P.; Orimo, S.-i. Materials Science and Engineering B 2004, 108, 9) alanes, (Walters, R. T.; Scogin, J. H. Journal of Alloys and Compounds 2004, 379, 135) amide, (Chen, P.; Xiong, Z.; Luo, J.; Lin, J.; Tan, K. L. Journal of Physical Chemistry B 2003, 107, 10967) borohydrides, (Vajo, J. J.; Skeith, S. L.; Mertens, F. J. Phys. Chem. 2005, 109, 3719) magnesium based hydrides, (Dornheim, M.; Doppiu, S.; Barkhordarian, G.; Boesenberg, U.; Klassen, T.; Gutfleisch, O.; Bormann, R. Scripta Materialia 2007, 56, 841) and mixed complex hydrides (Nakamori, Y.; Ninomiya, A.; Kitahara, G.; Aoki, M.; Noritake, T.; Miwa, K.; Kojima, Y.; Orimo, S. Journal of Power Sources 2006, 155, 447) have been recently reported with improved hydrogen storage characteristics.

Hydrogen storage technology is essential for any hydrogen-based transportation system. The development of improved hydrogen storage materials will solve a major storage issue, which, at present, is an impediment for a future hydrogen based economy. This hydrogen storage materials development technology will make the use of hydrogen fuel cells feasible as a long term solution for transportation. This will also provide a solution to various issues related to the present fossil fuels (gasoline, coal etc.); in particular, it will (i) protect the earth's atmosphere from the greenhouse gas emissions, (ii) provide an alternative clean fuel to replace the current depleting gasoline, (iii) provide energy security and (iv) offer pollution free living based on zero-emission vehicular transportation for healthy living.

SUMMARY OF THE INVENTION

The present inventors have found that special processing conditions involving mechano-chemical mixing of $LiBH_4/LiNH_2/MgH_2$ exhibit superior reversible hydrogen storage characteristics at moderate temperatures. Solid state synthesis pertaining to destabilization of $LiBH_4$ and $LiBH_4/LiNH_2$ (Chater, P. A.; Anderson, P. A.; Prendergast, J. W.; Walton, A.; Mann, V. S. J.; Book, D.; David, W. I. F.; Johnson, S. R.; Edwards, P. P. Journal of Alloys and Compounds 2007, 446-447, 350) with $MgH_2$ has been found to enhance the reversible hydrogen storage characteristics. The multinary complex hydride Li—Mg—B—N—H possesses a theoretical hydrogen capacity of approximately 8-10 wt. %.

Prior hydrogen storage has been reported to reach only about 3 wt. % of reversible hydrogen release between 160-200° C. (Lewis, G. J.; Sachtler, J. W. A.; Low, J. J.; Lesch, D. A.; Faheem, S. A.; Dosek, P. M.; Knight, L. M.; Halloran, L.; Jensen, C. M.; Yang, J.; Sudik, A.; Siegel, D. J.; Wolverton, C.; Ozolins, V.; Zhang, S. Journal of Alloys and Compounds 2007, 446-447, 355; Yang, J.; Sudik, A.; Siegel, D. J.; Halliday, D.; Drews, A.; Carter Iii, R. O.; Wolverton, C.; Lewis, G. J.; Sachtler, J. W. A.; Low, J. J.; Faheem, S. A.; Lesch, D. A.; Ozolins, V. Journal of Alloys and Compounds 2007, 446-447, 345). It was reported that the $MgH_2$ acts as a catalyst and assists in self-catalyzing the material to release hydrogen with three main reactions:

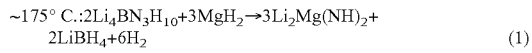

$$\sim 175° C.: 2Li_4BN_3H_{10} + 3MgH_2 \rightarrow 3Li_2Mg(NH)_2 + 2LiBH_4 + 6H_2 \quad (1)$$

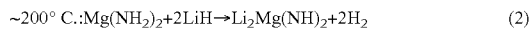

$$\sim 200° C.: Mg(NH_2)_2 + 2LiH \rightarrow Li_2Mg(NH)_2 + 2H_2 \quad (2)$$

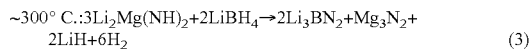

$$\sim 300° C.: 3Li_2Mg(NH)_2 + 2LiBH_4 \rightarrow 2Li_3BN_2 + Mg_3N_2 + 2LiH + 6H_2 \quad (3)$$

This invention provides specially prepared complex composite hydride materials for hydrogen storage applications. An inexpensive, simple, efficient and solid state synthesis process of mechano-chemically prepared complex hydrides under specific conditions has resulted in an improvement in the hydrogen storage properties such as hydrogen storage capacity and fast sorption kinetics. This invention leads to synthesis of multi-phase complex (composite) hydride materials with significantly improved performance and tailor-made thermodynamic properties. Additionally, the mechano-chemical approach of synthesizing complex hydride materials can be easily scaled up for a commercial manufacturing process, providing hydrogen storage materials with superior kinetics, high hydrogen storage capacity, light weight elements and/or compounds, low cost, and environmental safety.

Mechano-chemical synthesis has been carried out by mixing of $LiBH_4 + 2LiNH_2 + MgH_2$ or similar stoichiometries and ball milling. Intermittent reactive gas purging using [Ar (95%)+$H_2$(5%)] was performed intermittently during the entire mechano-chemical process to obtain mixtures with a new structural phase complex hydrides having finer nano-sized particulates. The processing times in milling were found to have no effect on the physical structure of LiBNH+$MgH_2$, but drastically altered the capacity, hydrogen release temperatures and microstructure of the composition. Finally, particle size was found to be very important to hydrogen storage and release. Excellent reversible cycling capacity of about ~6-8 wt. % was reproducibly obtained with operating hydrogenation temperature and pressure varying from 150-250° C. and 60-80 bars, respectively. Hydrogen absorption and desorption tests show rapid kinetics with 90% of hydrogen either absorbed or desorbed in less than 10 minutes.

Hydrogen storage materials involving combinations of hydride compounds such as $LiBH_4$ with $MgH_2$ (see for example JP20050229790; U.S. Pub. No. 2005/0916) or $LiBH_4$ and $LiNH_2$ with Mg powders (e.g. CN20061118471; U.S. Pub. No. 2006/1117) or even more generally $AH_x$ with $MH_y$, which includes $LiBH_4$ with $LiNH_2$ (e.g. U.S. Pub. No. 2007/0264182) provide a means for on-board hydrogen storage.

Combining $LiBH_4$, $LiNH_2$ and $MgH_2$ using mechano-chemical methods creates a new phase of material by (i) combining the materials in various stoichiometries, (ii) using various process gases before and during milling, and/or (iii) subsequently adding nano-sized dopants of materials such as Ni, Fe, Co, Cu, Mn, Zn, Sn, Ti, Ag, and carbon nanotubes with varying concentrations and possible with co-addition of any combination of these materials before a final milling step. The process gas during the mechano-chemical milling includes hydrogen, argon, nitrogen, and combinations thereof. The milling speed and duration varies from 100 rpm to 500 rpm and from 10 minutes to 12 hours, respectively. The milling process can be preceded by a gas purge and can be interrupted by a gas purge for a time of 5 minutes to 1 hour. The amount of material and type, size, and quantity of balls inside the mill can be varied as well. The gas purge and the addition of the nano-sized dopants as well as the combination of the three main constituents, $LiBH_4$, $LiNH_2$ and $MgH_2$, which may be obtained from chemical suppliers such as Sigma Aldrich, are important features provided by the present invention relative to the technology in the aforementioned publications and other previous technologies.

In one aspect, this invention provides a process of producing a complex material for hydrogen storage, particularly a combination of $LiNH_2$, $LiBH_4$, $MgH_2$, and with or without an additive or combinations of nano-sized dopant materials such as Ni, Fe, Zn, carbon nanotubes (CNTs), Mn, Co, Cu, Sn, and other materials by using a mechano-chemical process. The influence of catalyst doping during the mechano-chemical processing, using nano-sized additives such as Ni, Co, Mn, and Fe, enhances the rates of dehydrogenation or decomposition of hydrogen from the host matrix, and lowers the hydrogen decomposition temperature of Li—Mg—B—N—H. The material is able to reversibly store hydrogen with concentrations of as much as 11 wt % $H_2$ at varying temperatures, depending on the amount and type of additive as well as the processing conditions employed.

BRIEF DESCRIPTION OF THE DRAWINGS

For a fuller understanding of the invention, reference should be made to the following detailed description, taken in connection with the accompanying drawings, in which:

FIGS. 2(a) and (b) are diagrams showing the processing condition flow chart of the five samples investigated showing the two main processing schemes employed. (A) Processing scheme 1 shows the generation of 3 samples generating by mixing all starting materials together. (B) Processing scheme showing the generation of samples by generating a quaternary composition, followed by subsequent mixing of $MgH_2$ to fill the voids of the quaternary composition.

DETAILED DESCRIPTION OF THE PREFERRED EMBODIMENT

Figures 1, 2:
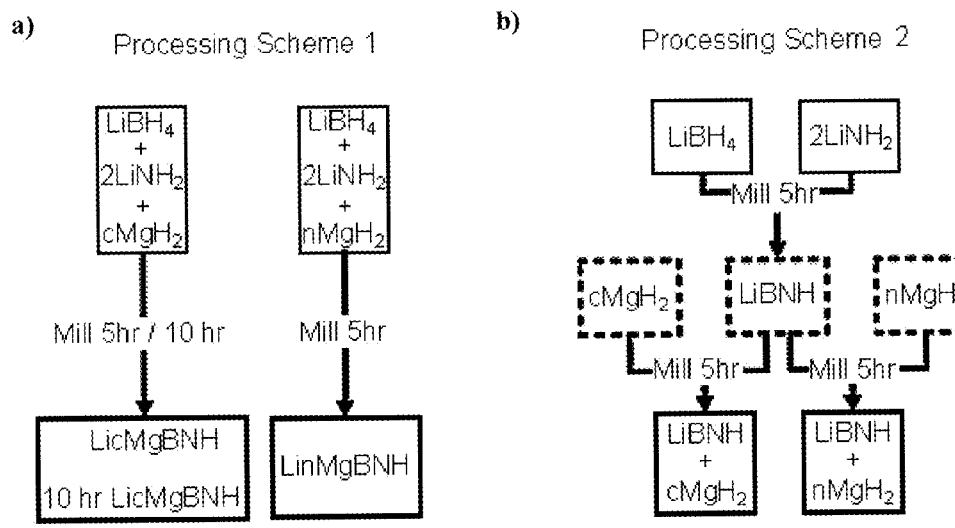
FIG. 1 is a table comparing the results for the multinary complex hydrides developed by different processing conditions (the best results are shown in bold).

A reversible hydrogen storage composition with storage capacity of ~5-6 wt. % was achieved at 150° C. in the multinary complex hydrides comprising $LiBH_4$, $LiNH_2$ and $MgH_2$. Various processing conditions and optimization strategies were adapted to prepare these complex hydrides in a solid state. A gas mixture comprising $Ar/H_2$ (95%/5%) was used as a milling environment. It was found that this $Ar/H_2$ mix, and not argon or nitrogen or hydrogen, was essential to keeping the material hydrided and to prevent particle agglomeration. Among the various reaction pathways, the pre-processed quaternary hydride LiBNH ad-mixed with either bulk or nanocrystalline $MgH_2$ ($LiBNH+cMgH_2$ and $LiBNH+nMgH_2$) milled for 5 hours shows pronounced hydrogen storage characteristics in reversible sorption cycles and lower activation energy of 145-148 kJ/mole at ~300° C. Irrespective of the processing scheme employed, it was found that all samples were intimate mixtures of LiBNH with $MgH_2$ and that no new chemical compound was formed. It was found that the samples prepared with nano $MgH_2$ exhibited $MgH_2$ particle sizes of approximately 10 nm, as compared to sizes of 35 nm to 75 nm for those samples prepared with commercial $MgH_2$. The small $MgH_2$ particles enable the sample to release hydrogen at temperatures as low as 150° C. as compared to 175° C. for the larger $MgH_2$ particles. Furthermore, it was found that the size of the LiBNH particles plays an important role on the hydrogen concentration. If the LiBNH particles have a size of approximately 28 nm and the $MgH_2$ particles are approximately within 19 nm (13 nm to 43 nm) of this size, and between 12 and 19 nm, the highest possible hydrogen concentration is achieved. When the $MgH_2$ and LiBNH particles are either too similar in size, as in the case of the LicMgBNH sample (3.3 nm difference), or if they are too different in size, as in the case of the 10 hr LicMgBNH sample (32.9 nm difference), the hydrogen concentration of the sample is reduced. The structural, microstructural and thermal desorption and activation energy calculations of all processed materials, as tabulated in FIG. 1, cumulatively suggest that synergistic effects of destabilization, nanocrystallization and process optimization lead to high hydrogen capacity materials.

As used herein, the term "nanocrystalline" is used to refer to a pre-process of mechano-chemical milling of commercial $MgH_2$ under $Ar/H_2$ (95/5%) atmosphere for at least 10-15 hours.

The term "nano $MgH_2$" refers to magnesium hydride compositions of about 10 nm. In some embodiments, the nano $MgH_2$ is created by milling of $MgH_2$, and optionally may be milled in an argon/hydrogen atmosphere as stated above.

As used herein, the term "milling" or "mechano-chemical milling" means planetary ball milling. The superimposition of the centrifugal forces from the grinding jar rotation and the common axis of the sun wheel produce high pulverization energy that is utilized to reduce the size of the compositions and results in restructuring of some compounds, such as with $LiBH_4$ and $LiNH_2$. As the rotational movement increases, Coriolis forces act on balls in the grinding jar, displacing them from the grinding jar walls. The balls fly through the grinding jar interior and impact against the sample on the opposite grinding jar wall. Speed differences between the balls and grinding jars produce an interaction between frictional and impact forces, releasing high dynamic energies. Differences occur between the speed of the grinding jar wall and the balls; resulting in strong frictional forces acting on the sample. The performance and the results obtained are determined by the choice of grinding jar and the balls with which it is filled. The selection depends on sample volume and sample fineness that is to be achieved and degree of purity required. Fine size reduction requires the use of small balls. The balls may be made of any known material in the art, however exemplary materials include agate, silicon nitride, sintered corundum, tungsten carbide, tempered chrome steel, hardened steel, stainless steel, zirconium oxide, and sintered aluminum oxide. Grinding sets made from the high-performance ceramics sintered corundum and zirconium oxide with their high abrasion resistance offer a long working life combined with minimal abrasion. Higher ball material density results in higher pulverization energy. As abrasion is frequently unavoidable during size reduction, the material for the grinding jars and balls should be selected so as to minimize interference to the subsequent analysis.

EXAMPLE 1

Multinary hydrides were synthesized from a quaternary composition of $LiBH_4$ and $LiNH_2$, with ad-mixing of nano $MgH_2$. The parent compounds, $LiBH_4$ and $LiNH_2$, (Sigma Aldrich, purity of at least 95%), and $MgH_2$ (Alfa Aesar, purity of 98%) were kept in an inert atmosphere in a glove box and used without further purification. The investigated samples were created in 4 g batches with a constant molar ratio of $2LiNH_2$:$LiBH_4$:$MgH_2$, while taking into account the purity of the parent compounds, by employing high energy ball milling (Planetary mill PULVERISETTE 6, Fritsch GmbH, Idar-Oberstein Germany) for 5 hours at 300 rpm with intermittent hydrogen/argon (5%/95%) purges for 20 minutes before milling and after 2 and 4 hours. This was done to ensure that as little hydrogen as possible was released during the milling process and to reduce the agglomeration of the hydride that occurs when pure hydrogen is used as compared to the hydrogen/argon mixture. The $MgH_2$ was either added as received or was added as a nano $MgH_2$. The nano $MgH_2$ ($nMgH_2$) was created by ball milling the commercial $MgH_2$ ($cMgH_2$) for 12 hours with intermittent hydrogen/argon purges every 2 hours.

This ensured the reduction of particle size as well as the decrease in hydrogen release temperature, as previously reported (Zaluska, A.; Zaluski, L.; Ström-Olsen, J. O. Journal of Alloys and Compounds 1999, 288, 217). The two main processing schemes that were used are shown in FIGS. 2(*a*) and (*b*). The first processing scheme was to add all parent compounds and mill for 5 or 10 hours using either commercial or nano $MgH_2$, which served as a reference material. The second processing scheme was to first create the quaternary structure LiBNH by milling $LiBH_4$ with $2LiNH_2$ for five hours and then adding either commercial or nano $MgH_2$, after which the quaternary and the $MgH_2$ were milled for an additional 5 hours. All milling was carried out in an inert atmosphere and the samples were purged with the hydrogen/argon mixture every 2 hours. In total, five different samples were created. The samples are referred to in this document according to the naming convention shown in the bold boxes of FIGS. 2(*a*) and (*b*).

The surface morphology of the milled samples was characterized using scanning electron microscopy (SEM, Hitachi S800). The samples were compressed into pellet form under constant pressure within the glove box and then transported to the SEM in a vacuum desiccator to minimize exposure to air and moisture. The structural phase identification and average crystallite size determination were characterized using X-ray diffraction (Philips X'Pert diffractometer). All samples were again pressed into pellet form in the glove box and sealed with Parafilm® (Pechiney Plastic Packaging Company) to minimize exposure to the elements. Zero background Silicon disc, 32 mm (GEMS Dugout, Pennsylvania, USA) was used for this purpose. Thermal programmed desorption (Quantachrome Autosorb 1C with TCD option) was used to determine the hydrogen release temperature as well as the activation energy of the milled samples using Kissinger's method (Kissinger, H. E. Journal of Research of the National Bureau of Standards 1956, 57, 217). Hydrogen sorption measurements were carried out on a Sievert's type apparatus (HyEnergy PCT Pro 2000) with isothermal conditions, ranging from room temperature up to 250° C. and with a hydrogen pressure varying from low vacuum to 80 bars. The samples were not investigated at temperature above 250° C., as a temperature that high is impractical for use in mobile applications. Both kinetic and pressure dependent hydrogen sorption measurements (PCT) were performed.

EXAMPLE 2

Figure 3:
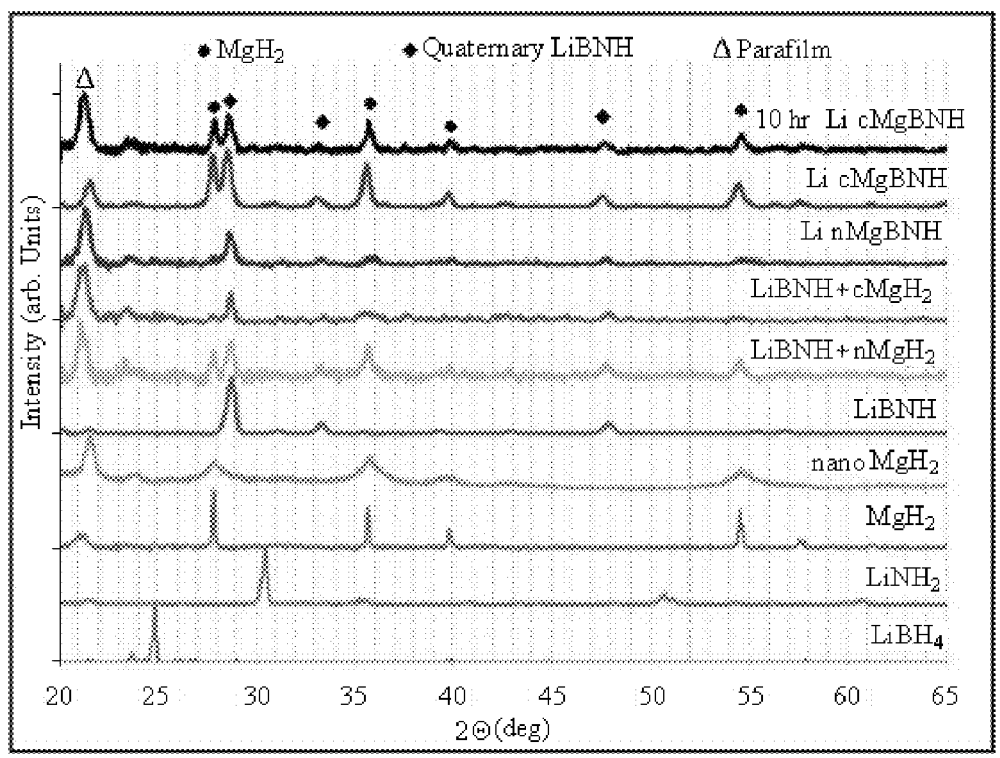
FIG. 3 depicts the XRD profile of the five differently processed materials as well as the parent compounds, $LiBH_4$, $LiNH_2$, $MgH_2$ and nano $MgH_2$.

X-Ray Diffraction (XRD) was performed to compare the patterns of the five differently processed complex hydrides, seen in FIG. 3. The parent compounds, $LiBH_4$, $LiNH_2$, as well as both commercial and nano $MgH_2$ are in the lower half of the figure as a reference. The peak around 21° C. is from the Parafilm® used to protect the samples during measurement. Neither $LiBH_4$ nor $LiNH_2$ peaks are observed in any of the five samples. This confirms that these two materials are fully consumed during the milling process and actually form a new quaternary structure, referred to as LiBNH.

The quaternary structure has been reported to be $Li_4BN_3H_{10}$ (Pinkerton, F. E.; Meisner, G. P.; Meyer, M. S.; Balogh, M. P.; Kundrat, M. D. The Journal of Physical Chemistry B 2005, 109, 6). The addition of commercial $MgH_2$ does not cause the formation of a new complex structure, but instead indicates that the quaternary structure is preserved, while the $MgH_2$ simply intermixes with the material. When the nano $MgH_2$ is added to $LiBH_4$ and $LiNH_2$ or to the quaternary LiBNH, the $MgH_2$ peaks are barely picked up by the XRD. This indicates that the small size of the $MgH_2$ causes the material to intermix and fill voids of the quaternary structure, which results in a nanocrystalline particle distribution, while still preserving the quaternary structure formed by the $LiNH_2$ and $LiBH_4$. All samples are a physical, rather than a chemical, mixture of the quaternary structure LiBNH with $MgH_2$.

Figure 4:
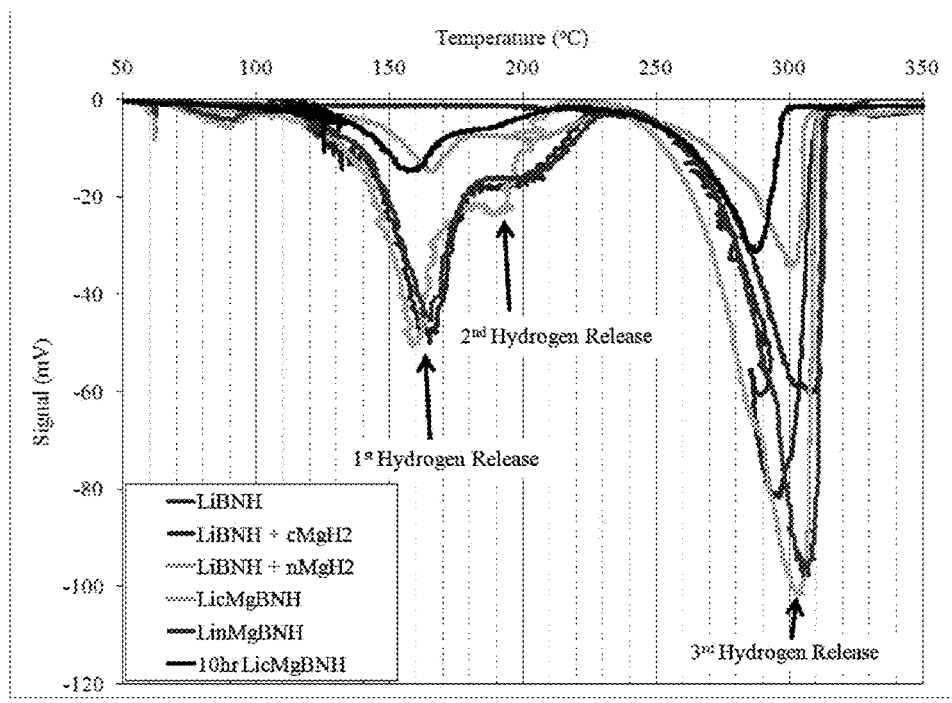
FIG. 4 is a graph of the TPD comparison of investigated processing variations showing the two main hydrogen release regions around 160° C. and 300° C.
Figure 7:
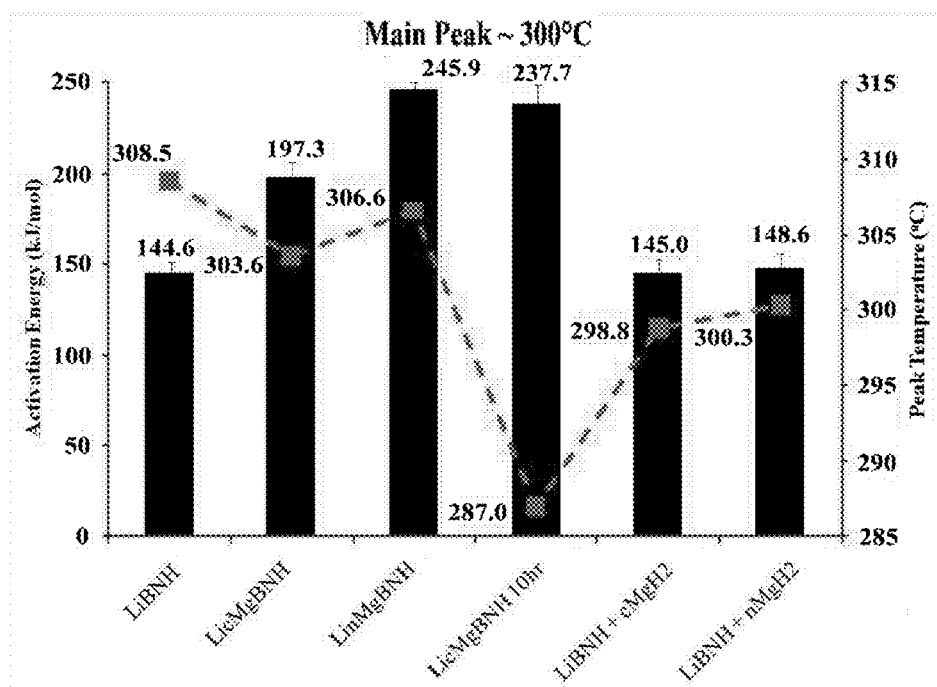
FIG. 7 is a bar graph of the activation energy, as calculated from the TPD data using Kissinger's method, compared with the main peak hydrogen release temperature.

Upon producing the complex hydrides, each sample was characterized for its thermal characteristics using thermal programmed desorption. (TPD) with a heating rate of 1, 5, 10, and 15° C./min. As compared to the quaternary structure, the multinary structure containing $MgH_2$ showed a 3-step hydrogen release mechanism, as is shown in FIG. 4. TPD analysis confirms a 3-step release for the LicMgBNH sample that has been reported, but also shows that the processing condition of the material does have an effect on the thermal decomposition characteristics. The first hydrogen release peaks between 153.3° C. for LiBNH+$nMgH_2$ and 165.2° C. for LinMgBNH, which is a relatively small difference in temperature. When investigating the second, or main, peak of the various samples, as seen in FIG. 7, it is interesting to note that the temperature range for main hydrogen release varies from 287° C. for the 10 hr LicMgBNH and 306.6° C. for LinMgBNH.

Figure 5:
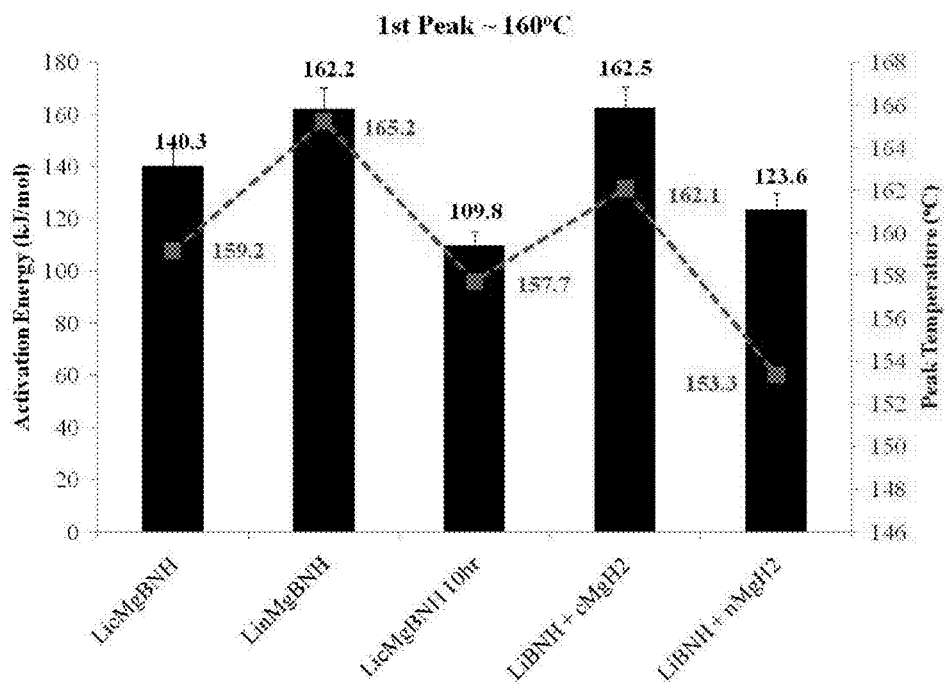
FIG. 5 is a bar graph of the activation energy, as calculated from the TPD data using Kissinger's method, compared with the first peak hydrogen release temperature.
Figure 6:
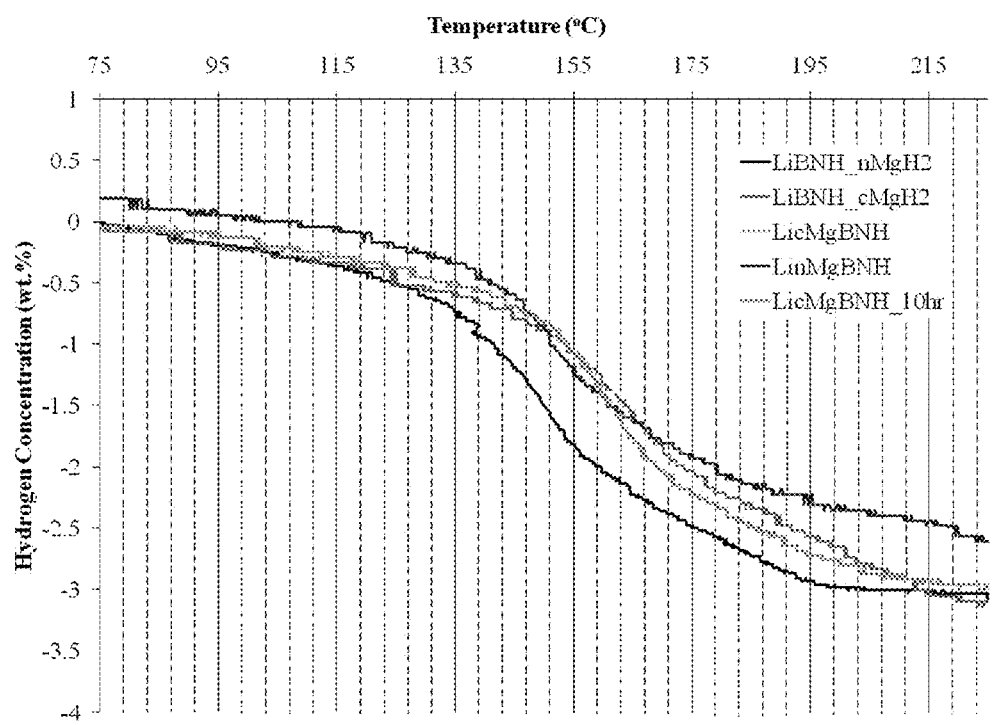
FIG. 6 is a graph of the first hydrogen release temperature range.

The activation energy of each sample was experimentally determined using Kissinger's method, based on TPD data taken at 1, 5, 10, 15° C./min for the two peaks and correlated to the hydrogen release temperature. When investigating the first peak, around 160° C., it is interesting to note that the 10 hr LicMgBNH sample has the lowest activation energy (109.8 kJ/mole) at 157.7° C., as seen in FIG. 5, but LiBNH+$nMgH_2$ has the lowest peak hydrogen release temperature (153.3° C.), seen in FIG. 5. Although these samples exhibit comparable decomposition temperatures, their activation energies vary by ~20 kJ/mole. A plausible reason is that the reaction pathways of ad-mixing $MgH_2$ with the starting materials in the first place (10 hr LicMgBNH) or after the quaternary formation (LiBNH+$nMgH_2$) proceeds with fine distribution of nanocrystalline $MgH_2$ in the host matrix of multinary hydrides. It has been recently claimed that the nanocrystallization of $MgH_2$ has significant impact on lowering the enthalpy of formation and enhancement of the reaction kinetics (Berube, V.; Chen, G.; Dresselhaus, M. S. International Journal of Hydrogen Energy 2008, 33, 4122; Niemann, M. U.; Srinivasan, S. S.; Phani, A. R.; Kumar, A.; Goswami, D. Y.; Stefanakos, E. K. Journal of Nanomaterials 2008, doi:10.1155/2008/950967, 9 pages). The high temperature main hydrogen release peak (~300° C.) for all the processed materials and the reference LiBNH quaternary hydride are shown in FIG. 7. While comparing the activation energies and decomposition temperatures of all the samples, it can be clearly inferred that the quaternary hydrides LiBNH combined with either commercial (LiBNH+$cMgH_2$) or nanocrystalline $MgH_2$ (LiBNH+$nMgH_2$) milled for 5 hours show lower values, e.g. 145-148 kJ/mole at ~300° C. At this juncture, it is slightly difficult to justify from FIGS. 5 and 7, which sample or the processed material possesses an optimum hydrogen release characteristic at these two main decompositions. Again, it is undoubtedly clear that both the steps occur at two different temperature regimes such as 160 and 300° C. for drive-off the hydrogen either surface adsorbed or bulk absorbed species. At the low temperature first step hydrogen release, the nano $MgH_2$ acts as a self-catalyst to speed up the reaction, with 10 hr LicMgBNH and LiBNH+$nMgH_2$ materials demonstrating lower activation energies, seen in FIG. 5. On the other hand, in the high temperature main hydrogen release, seen in FIG. 7, temperature of 300° C. act as a driving force to release hydrogen from the bulk structures of both LicMgBNH and LinMgBNH milled only for 5 hours. Hence, these materials exhibit lower activation energies that are comparable to pristine LiBNH. Based on the detailed analysis, it was concluded that an additional 5 hours of ball milling, either of the all-in-one hydride (10 hr LicMgBNH) or the quaternary/nanocrystalline hydride mixture (LiBNH+$nMgH_2$), will alter the decomposition characteristics, especially the activation energy which is very vital for hydrogen storage.

Figure 8:
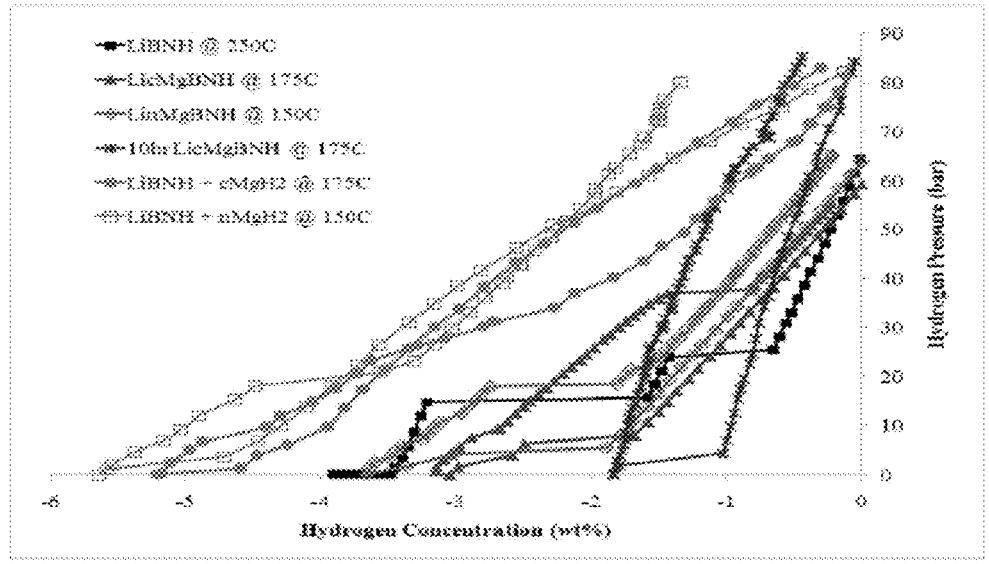
FIG. 8 is a graph showing the comparison of the hydrogen sorption characteristics of the various processing conditions at the lowest hydrogen release temperature.

Pressure-Composition-Temperature (PCT) isotherms were determined for the multinary complex hydrides created with different processing conditions, seen in FIG. 8. The dehydrogenation PCT of LiBNH quaternary hydride is plotted for reference. The PCT studies of the multinary samples are carried out under the following conditions: temperature, T=150-175° C.; pressure difference between aliquots, $\Delta P$=3 bars; absorption pressure limit, $P_a$=80 bars; desorption pressure limit, $P_d$=0bar; and reservoir volume, $V_r$=160 cm³. Since all these samples are in hydride phases, the dehydrogenation experiment was followed by the rehydrogenation for at least 10 hours. The PCT characteristics and their observations are given with respect to the sample processing conditions as follows.

The dehydrogenation capacity of quaternary hydride, LiBNH was determined to be ~4 wt. % at 250° C. A two-step plateau pressure region, $P_p$ (low plateau at P<20 bars and high plateau at P<30 bars) was observed and might pertain to the two phase components of $LiBH_4$ and $LiNH_2$. Although the hydrogen release capacity of 4 wt. % at 250° C. seems promising, these quaternary hydrides are not reversible at these temperatures.

The multinary complex hydrides LicMgBNH and LinMgBNH processed with either commercial or nanocrystalline $MgH_2$ and milled all-in-one for 5 hours reveal reproducible hydrogen capacity of 3-4 wt. %. It is noteworthy to mention that LinMgBNH possesses at least 1 wt. % higher capacity and 25° C. reduction in temperature as compared to the LicMgBNH counterpart. This could be achieved because of the uniform distribution of fine $MgH_2$ nanoparticles that might act as catalytic centers for lowering the hydrogen dissociation temperatures. Yet another difference between these two processed materials is the tailoring of the plateau pressure (hydrogen/hydride equilibrium region), which is crucial for a hydrogen storage system to be viable for mobile applications. The LinMgBNH material exhibits reduction in the absorption plateau pressure by 20 bars in contrast to the LicMgBNH due to nanoparticulate formation.

A greater reversible hydrogen storage capacity of 5.3-5.8 wt. % was found for LiBNH+$cMgH_2$ and LiBNH+$nMgH_2$, i,e, the quaternary hydrides LiBNH either milled with commercial or nano $MgH_2$ for 5 hours, at temperatures of 150° C. to 175° C. The nano $MgH_2$ loaded LiBNH outperformed its commercial counterpart with a higher hydrogen capacity of 5.8 wt. % at 150° C. as compared to 175° C. There exist inflections of plateau pressure regions; however, they are not as clearly defined as the LicMgBNH and LinMgBNH samples. Moreover, the sorption plateau of these samples resembles greatly the pristine LiBNH that is the precursor material for the multinary hydride formation confirming XRD data. Overall, it is unambiguously claimed that LiBNH admixed either with commercial or nano $MgH_2$ and milled for 5 hours, exhibits a high reversible hydrogen storage capacity of ~6 wt. % at temperatures less than 175° C. Moreover, the reversible hydrogen release storage characteristics have been confirmed and reproducibly obtained in these complex multinary structures performed by South West Research Institute (SWRI), Texas, an independent validation center operated by the U.S. Department of Energy. The extended milling duration of 10 hours for the three component systems, $2LiNH_2$+$cMgH_2$+$LiBH_4$ and labeled 10 hr LicMgBNH, show poor hydrogen performance as depicted in FIG. 8. A low hydrogen desorption capacity of 2 wt %, a low plateau pressure region of less than 5 bars with less or no reversibility was obtained in this material. The crystallite agglomeration or the amorphous phase during the prolonged milling is expected to be the limiting factor for the absence of plateau and decrease in the overall hydrogen storage capacity.

Figure 9:
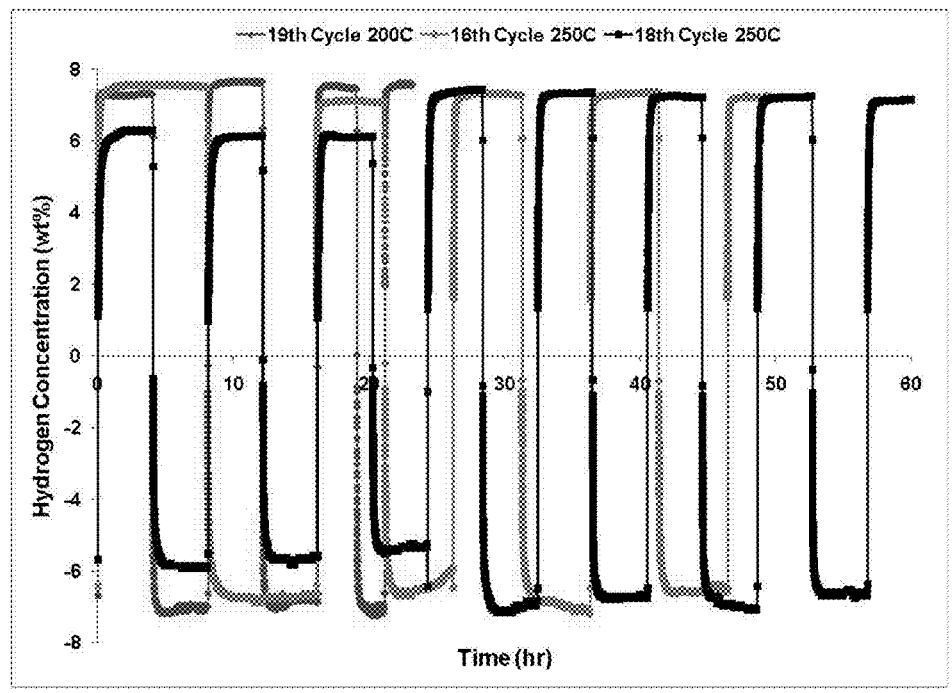
FIG. 9 is a graph showing the cycle life hydrogenation and dehydrogenation kinetics of LicMgBNH material at 200° C. to 250° C.

Excellent reversible cycling capacity of about ~6-8 wt. % was reproducibly obtained with operating hydrogenation temperature and pressure varying from 150-250° C. and 60-80 bars, respectively. Hydrogen absorption and desorption tests show rapid kinetics with 90% of hydrogen either absorbed or desorbed in less than 10 minutes as depicted in FIG. 9.

Figure 10:
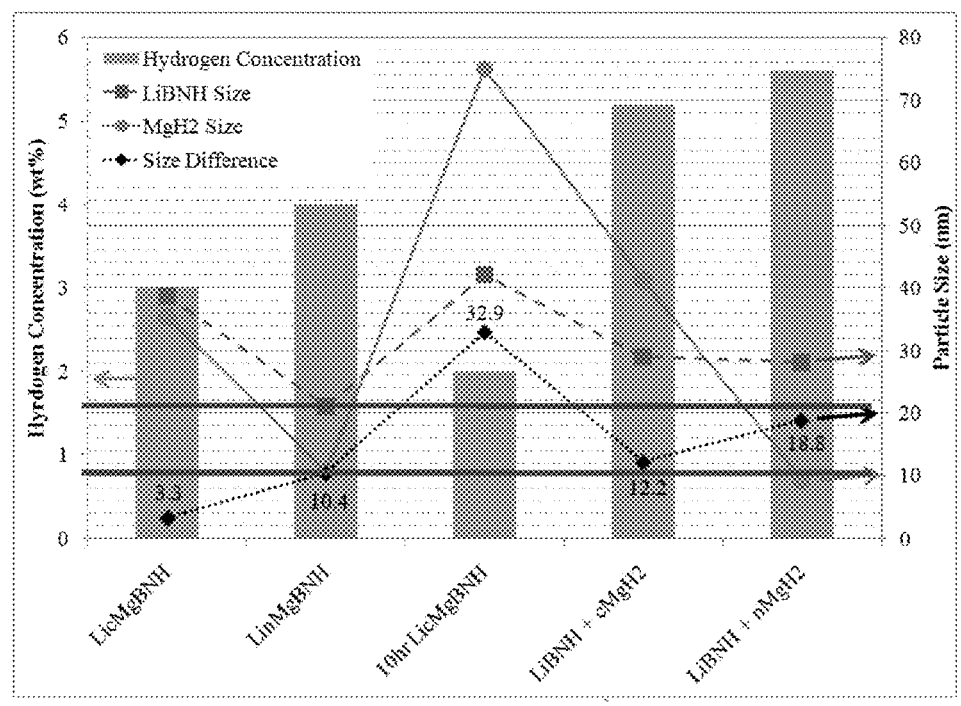
FIG. 10 is a bar graph showing the comparison of hydrogen concentration and particle size of the quaternary LiBNH and $MgH_2$ phases after milling.

To better understand the hydrogen performance of the differently processed materials, the hydrogen capacity was investigated with respect to the particle sizes of the quaternary phase, LiBNH, and the $MgH_2$. The particle sizes were calculated from the XRD data, seen in FIG. 3, of each material using Scherrer's method (Scherrer, P. Goettinger Nachrichten 1918, 2, 98). The initial particle sizes of $LiNH_2$, $LiBH_4$, $MgH_2$, nano $MgH_2$ and LiBNH were determined to be 138 nm, 152 nm, 212 nm, 27 nm, and 60 nm, respectively. As seen from FIG. 8, the nano size $MgH_2$ has an effect on the initial hydrogen release temperature. Both samples synthesized with nano $MgH_2$ release hydrogen at 150° C. as compared to 175° C. for all the other samples, which were synthesized with its commercial counterpart. The $MgH_2$ particle size for the nano $MgH_2$ samples are both approximately 10 nm, whereas the particle size of the commercial $MgH_2$ samples vary from 35 nm to 75 nm, as seen in FIG. 10. It is important to note that the particle size of both $MgH_2$ and LiBNH are largest for the 10 hr LicMgBNH sample, which explains the poor hydrogen performance of the sample, since it is well known that larger particles, and therefore a smaller surface area, correspond to poorer hydrogen performance (less than 2 wt. % capacity). A milling duration of more than 5 hours is in fact counterproductive and allows for the particle size to increase, as both the LiBNH and $MgH_2$ particles agglomerate. When looking at the correlation between particle size and hydrogen concentration, as shown in FIG. 10, it becomes evident that the size of the LiBNH particles plays an important role on the hydrogen concentration. If the LiBNH particles have a size of approximately 28 nm and the $MgH_2$ particles are approximately within 15 nm (13 nm to 43 nm) of this size, the highest possible hydrogen concentration is achieved (5.5 wt. %). When the $MgH_2$ and LiBNH particles are either too similar in size, as in the case for the LicMgBNH sample (3.3 nm difference), or if they are too different in size, as in the case for the 10 hr LicMgBNH sample (32.9 nm difference), the hydrogen concentration of the sample is reduced.

Figure 11:
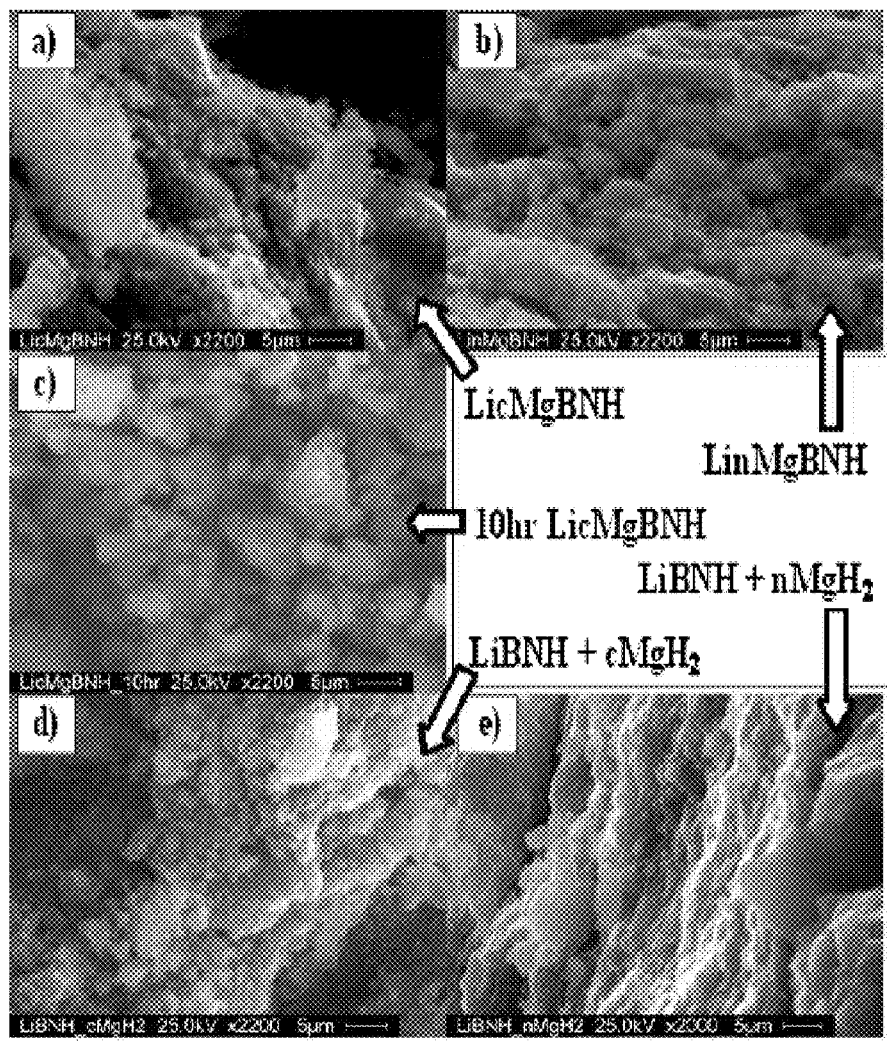
FIGS. 11(a)-(e) are SEM images depicting the surface morphology of the five samples at 2200× magnification. a) LicMgBNH, b) LinMgBNH, c) 10 hr LicMgBNH, d) $LiBNH+cMgH_2$, e) $LiBNH+nMgH_2$.

To perform SEM imaging of the surface morphology, the samples were pressed into pellet form with a uniform thickness and pressure. The SEM images at 2,200× magnification are shown in FIGS. 11(a)-(e) for the five main samples. FIGS. 11(a) and 11(b) show the two samples that were milled for a total duration of 5 hours. The sample prepared using the commercial $MgH_2$, seen in FIG. 11(a), contains visibly larger particles than the sample prepared using nano $MgH_2$, seen in FIG. 11(b), is due mainly to the fact that the commercial $MgH_2$, which does not form a chemical bond with the quaternary structure but instead is intermixed with the material, is made up of larger particles than the nano $MgH_2$. When the sample is milled for 10 hours, as seen in FIG. 11(c), the material is composed of uniformly agglomerated nanoparticles. This is surely due to the fact that the commercial $MgH_2$ has enough time, upon formation of the quaternary structure, to be ground into smaller particles and then given enough time to coalesce. When $MgH_2$ was added to the quaternary structure LiBNH, the commercial $MgH_2$ produced comparable particle size distribution, seen in FIG. 11(d), to the sample containing nano $MgH_2$, seen in FIG. 11(e).

EXAMPLE 3

Figure 12:
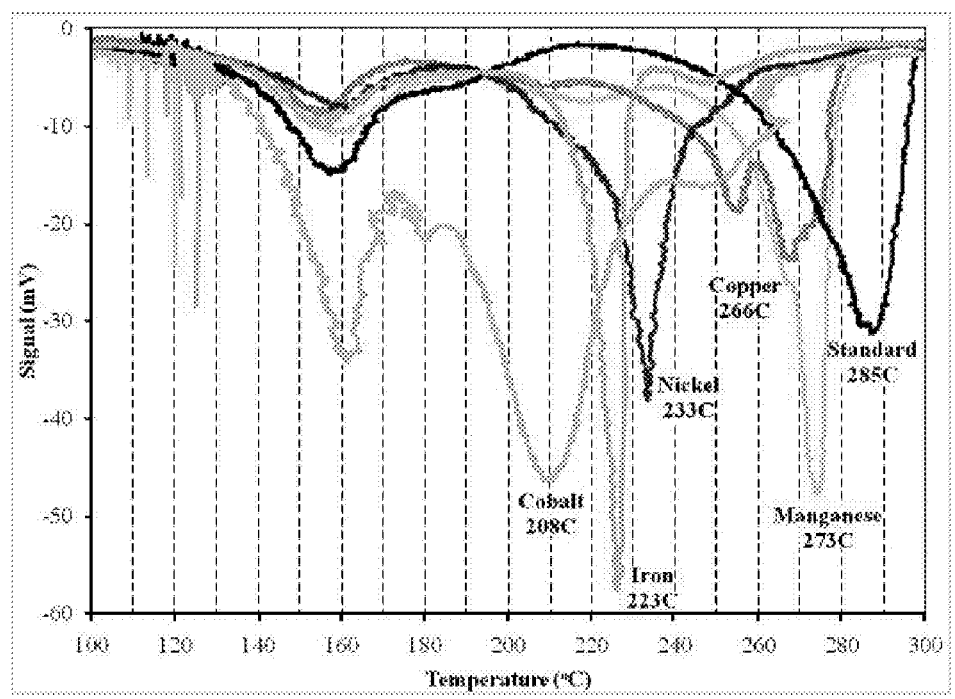
FIG. 12 is a graph of the TPD comparison of investigated processing variations showing the two main hydrogen release regions around 160° C. and 300° C. for samples doped with nanomaterials such as Ni, Co, Fe, Mn, and Cu.
Figure 13:
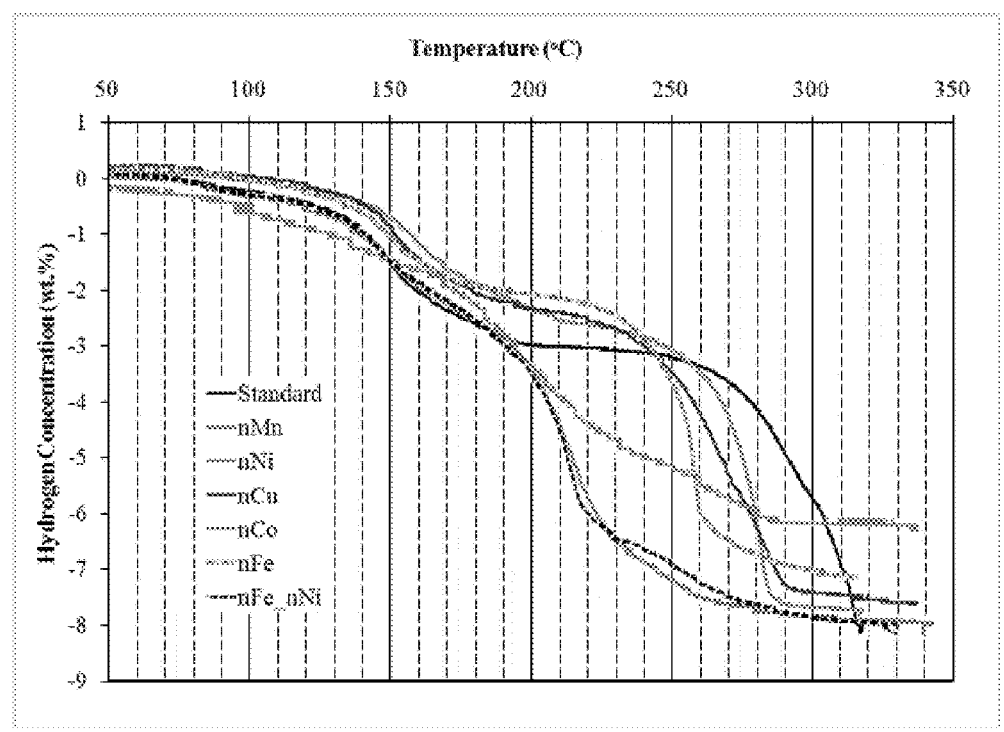
FIG. 13 is a graph of the hydrogen release of $LiBNH+nMgH_2$ with 2 mol % of nano-sized additives over a usable temperature.

The effect of nanomaterial-doping was tested in the complex hydride LiBNH+$nMgH_2$. Each nanomaterial doped hydride was characterized by TPD for its thermal characteristics. As with the multinary structure containing $MgH_2$, a 3-step hydrogen release mechanism is evident, as is shown in FIG. 12. TPD analysis indicates that the material doping has a marked effect on the thermal decomposition characteristics, both increasing hydrogen decomposition of both the hydrogen release peaks, and reducing the temperature of the third hydrogen release. The first hydrogen release peaks between 153.3° C. for LiBNH+$nMgH_2$ and the nanoiron-, nanonickel-, nanocopper-, and nanomanganese-doped LiBNH+$nMgH_2$ compositions and 162° C. for the nanocobalt-doped LiBNH+$nMgH_2$ composition, seen in FIGS. 12 and 13. Investigating the second, or main, peak, of the various samples, temperatures range for main hydrogen release vary from 210° C. for the nanocobalt-doped LiBNH+$nMgH_2$ to about 288° C. LiBNH+$nMgH_2$. Interestingly, the nanocobalt-, nanoiron-, and nanomanganese-doped LiBNH+$nMgH_2$ samples possessed hydrogen release that greatly surpassed that of the parent LiBNH+$nMgH_2$ composition while also reducing the temperature required for the release by as much as almost 80° C.

EXAMPLE 4

A PEM fuel cell system was designed to test the transfer of hydrogen from a high pressure tank to low pressure (metal hydride) tank. Coupling devices (Swagelok Co., Solon, Ohio) made of stainless steel that could withstand high pressure over 5000 psig were used. These devices are also capable of transporting flammable gases such as hydrogen. A metal hydride tank (20 standard L), connected to a remote controlled car, was activated by exposing the composition to hydrogen. This causes the metal hydride to act as a sponge for hydrogen sorption. To activate this metal hydride, the tanks were connected to hydrogen source and a low pressure regulator set to thirty bar (435 psig). After waiting 80 minutes, the pressure was released to about ten bar (100 psig) and increased the hydrogen pressure back to thirty bars. This process was repeated four times. After activation was complete, the tanks were refueled and reconnected to the fluid system with the low pressure reading set to 30 bars. After thirty minutes the tank was disconnected.

Figure 14:
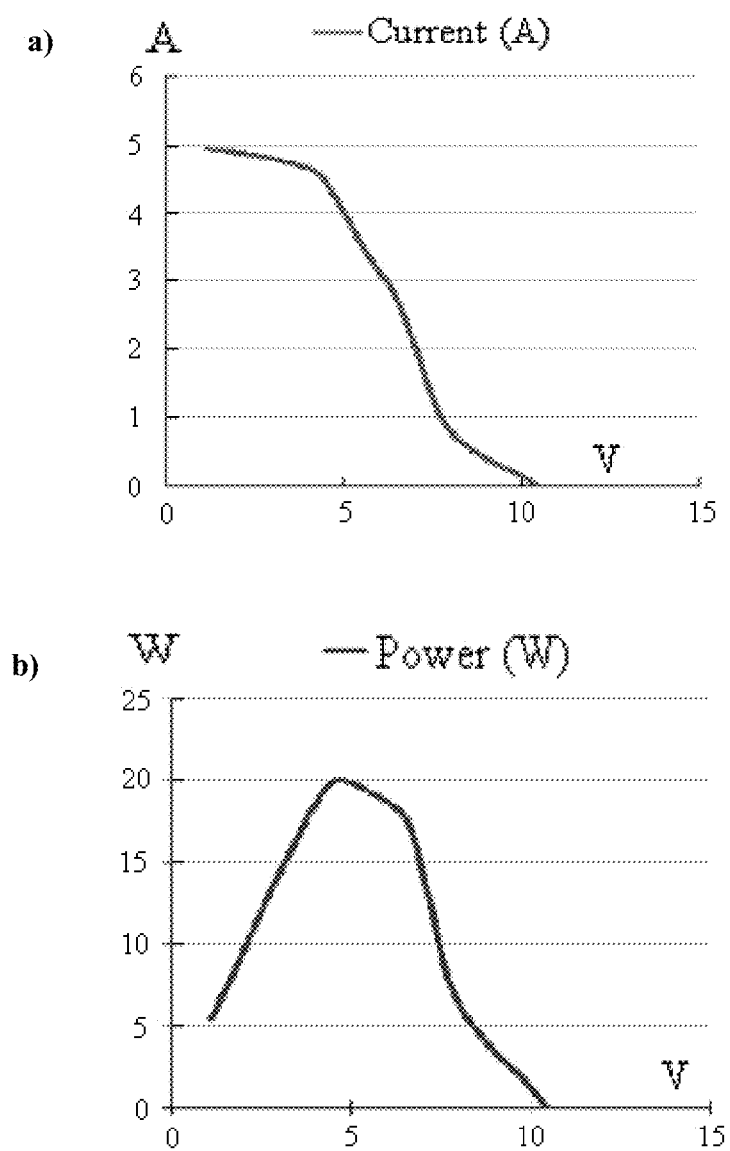
FIGS. 14(a) and (b) are graphs showing the (A) current and (B) power characteristics of the PEM fuel cell attached to a complex hydride storage device.
Figure 15:
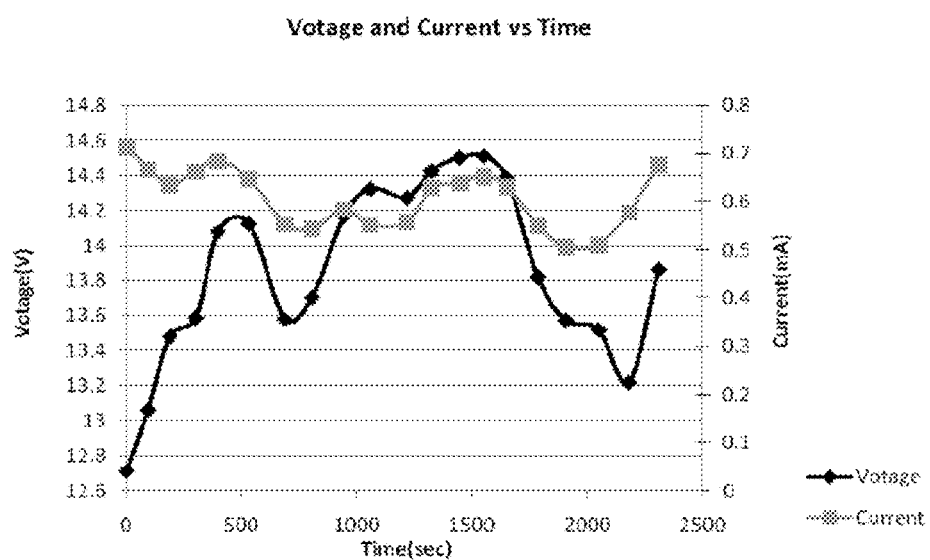
FIG. 15 is a graph showing the current and voltage variation over time during fuel cell operation.

The remote control car was tested by connecting a hydrogen fuel cell to the car. The car successfully ran, and performed similarly to a battery powered remote control car. It was also observed that the hydrogen fueled car lasted for about 1 hour with average voltage output of this fuel cell is 6 V, whereas the battery powered car lasted only 30 minutes with six AA batteries (9V). However, the low voltage output caused the car to perform slower with fuel cell, as seen in FIG. 14. Hydrogen total amount and flow rate could be determined by measuring volumetric water displacement method. Data was recorded every 50 ml till 1 liter was reached in six separate trials to assure accuracy. The rate of voltage and current produced from the fuel cell was determined, as seen in FIG. 15. A minor problem was noted in the adequate flow rate from the $H_2$ tanks. To produce a constant flow rate of $H_2$, the metal hydride tank required heat since hydrogen release from metal hydrides associated with endothermic process. The $H_2$ flow caused the tank to cool, making it difficult to maintain an ambient temperature.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of a hydrogen storage composition, it will be apparent to those skilled in the art that variations and modifications are possible without deviating from the broad spirit and principle of the present invention. It is also to be understood that the following claims are intended to cover all of the generic and specific features of the invention herein described, and all statements of the scope of the invention which, as a matter of language, might be said to fall therebetween.

What is claimed is:

1. A method of generating a hydrogen storage composition, comprising the steps of:
   creating a quaternary LiBNH composition mixture or composition premix,
      wherein the quaternary LiBNH composition mixture is created by
         ball milling $LiBH_4$ and $LiNH_2$ to form a quaternary LiBNH composition;
         adding a $MgH_2$ to the quaternary LiBNH composition to form the quaternary LiBNH composition mixture;

wherein the composition premix is created by mixing LiBH$_4$, LiNH$_2$, and MgH$_2$ together to form a composition premix;

placing the quaternary LiBNH composition mixture or composition premix into a high energy ball mill;

purging the ambient air from the ball mill using a argon/hydrogen gas, wherein the argon/hydrogen gas is 95% argon and 5% hydrogen;

ball milling the quaternary LiBNH composition mixture or composition premix for 5 hours with argon/hydrogen gas purging to form nanoparticles consisting essentially of MgH$_2$ and quaternary LiBNH wherein the nanoparticles fill the voids in the quaternary structure.

2. The method of claim 1, wherein the LiBH$_4$ and LiNH$_2$ are ball milled for 5 hours.

3. The method of claim 1, wherein the LiBH$_4$ and LiNH$_2$ are exposed to 5% H$_2$/95% Ar gas purges.

4. The method of claim 3, wherein the gas purge lasts between 5 minutes and 1 hour intervals.

5. The method of claim 4, wherein the LiBH$_4$ and LiNH$_2$ are exposed to at least one gas purge at 20 minutes before ball milling, 2 hours after ball milling began, or 4 hours after ball milling began.

6. The method of claim 1, wherein the hydrogen storage composition has a LiBH$_4$:LiNH$_2$:MgH$_2$ molar ratio of 1:2:1.

7. The method of claim 1, wherein the MgH$_2$ was ball milled for 12 hours before mixing with the quaternary LiBNH composition.

8. The method of claim 7, wherein the MgH$_2$ is purged with 5% H$_2$/95% Ar every 2 hours after ball milling began.

9. The method of claim 8, wherein the gas purge lasts between 5 minutes and 1 hour intervals.

10. The method of claim 1, wherein the MgH$_2$ have a size difference to the LiBNH composition of between 3.3 nm and 32.9 nm.

11. The method of claim 10, wherein the MgH$_2$ is about 10 nm to about 20 nm in size.

12. The method of claim 1, wherein the LiBNH composition particles are about 28 nm in size.

13. The method of claim 1, wherein the milling speed is between 100 rpm and 500 rpm.

14. The method of claim 1, further comprising adding at least one nanomaterial dopant selected from the group consisting of nickel, iron, zinc, carbon nantotubes, cobalt, manganese, titanium, copper, silver and tin after the milling of the quaternary LiBNH with MgH$_2$.

15. The method of claim 10, wherein the MgH$_2$ have a size difference to the LiBNH composition of 15 nm.

16. The method of claim 12, wherein the MgH$_2$ have a size difference to the LiBNH composition of 15 nm.

17. The method of claim 1, wherein the ball milling to form particles consisting essentially of MgH$_2$ and quaternary LiBNH is performed at from between 100 rpm to 500 rpm and from between 10 minutes to 12 hours.

18. The method of claim 8, wherein the gas purge is prior to milling and at 2 and 4 hours of milling.

* * * * *